United States Patent Office 2,873,693
Patented Feb. 17, 1959

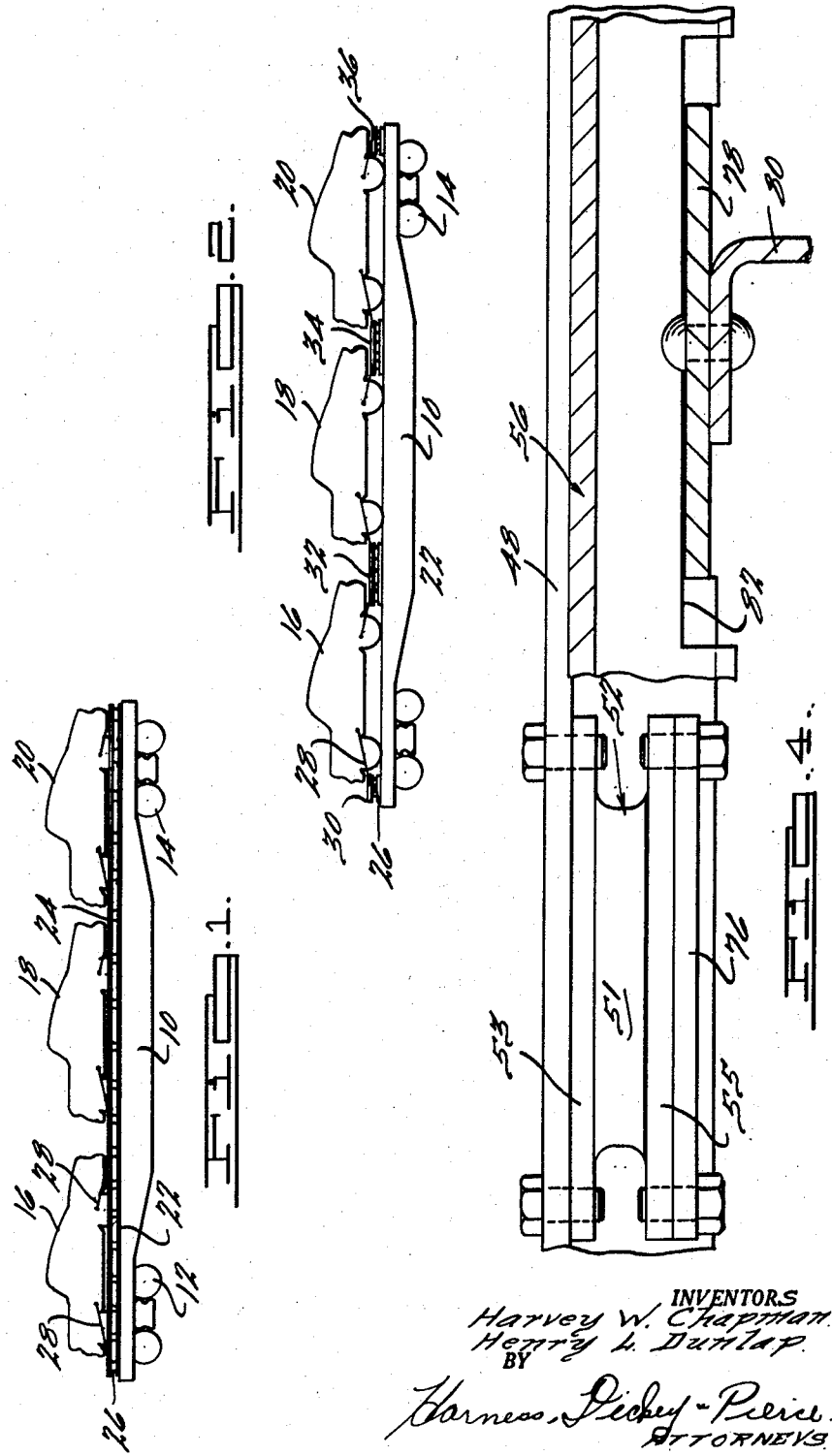

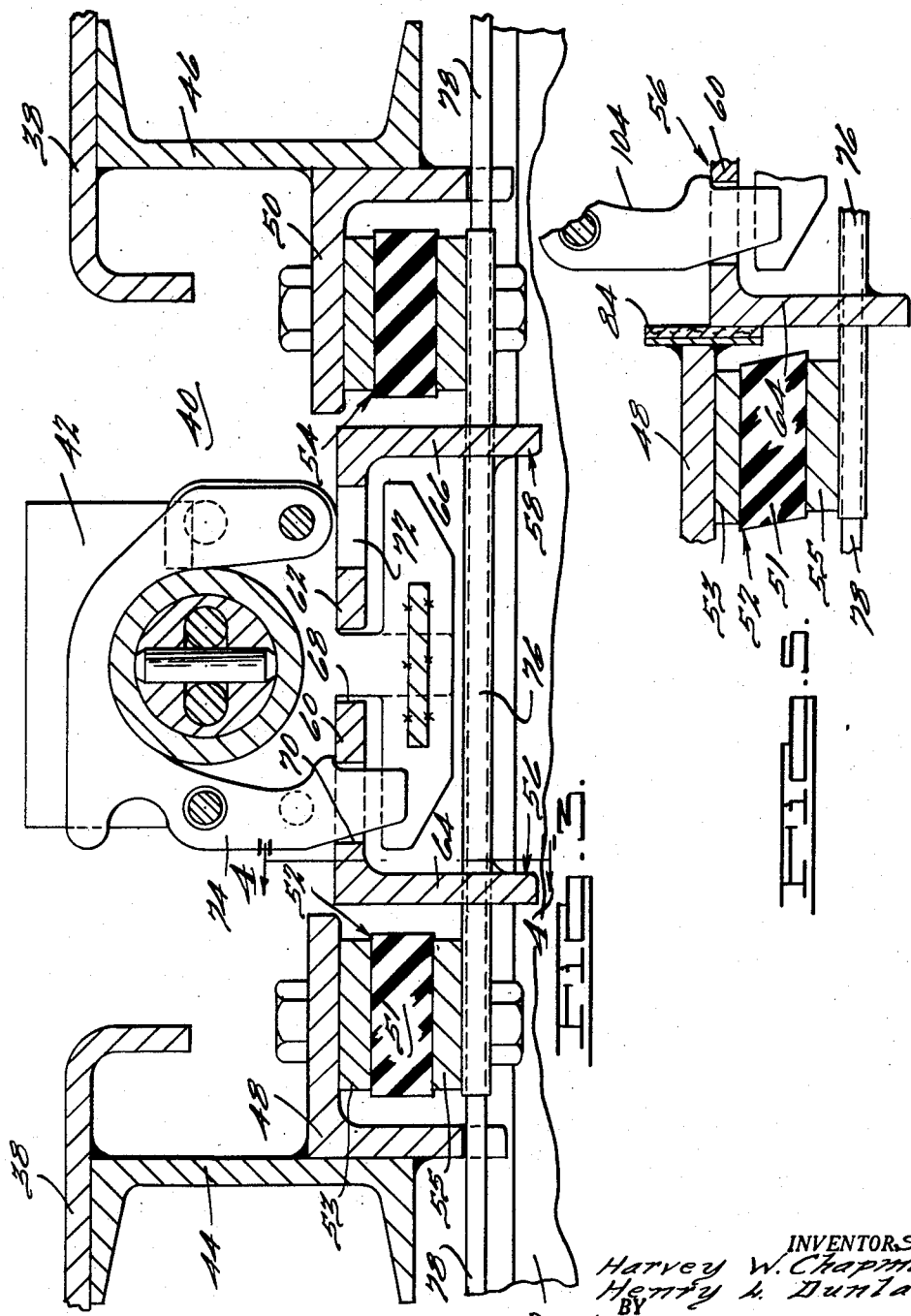

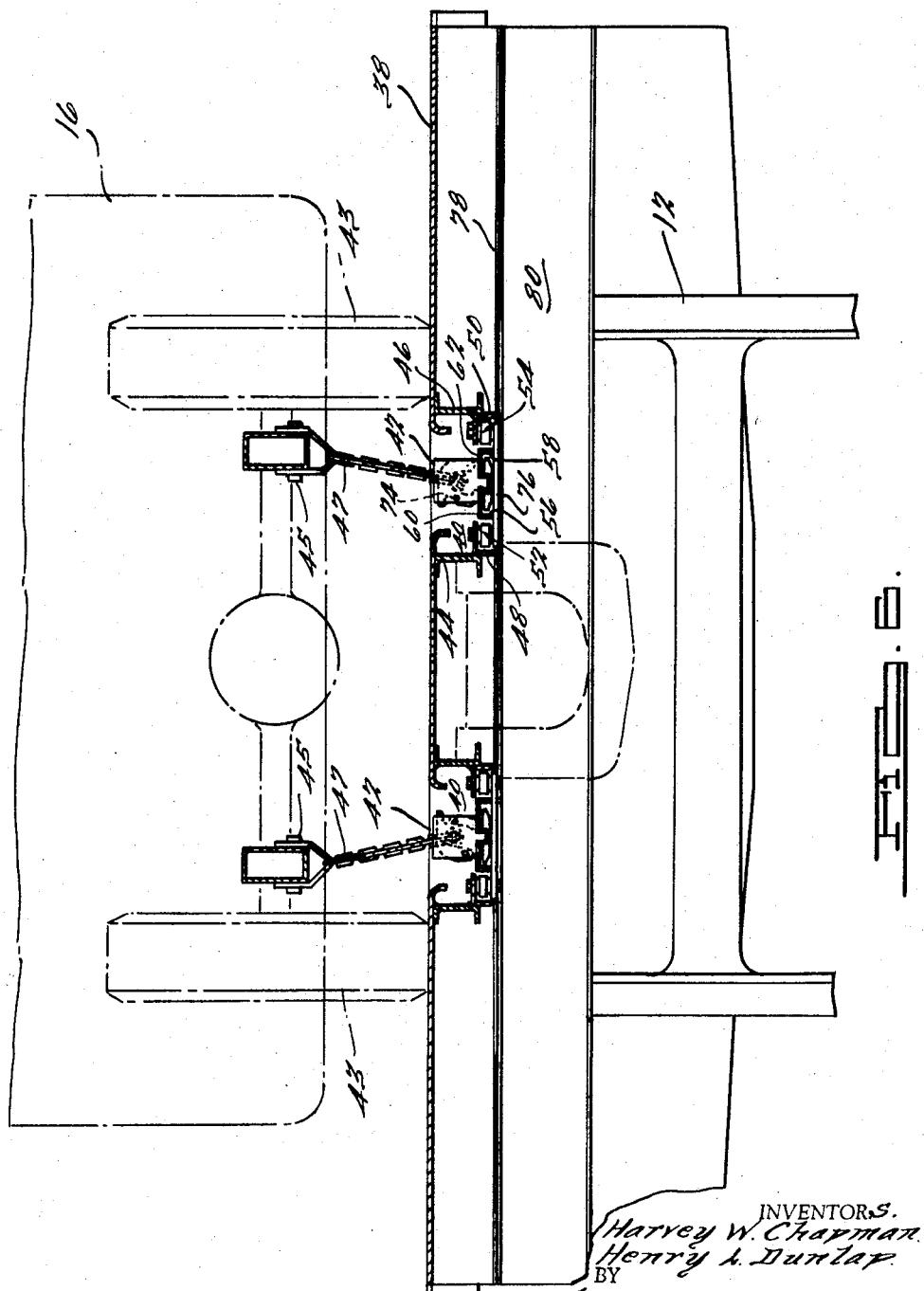

2,873,693
RESILIENTLY MOUNTED TIE-DOWN SUPPORT RAILS

Harvey W. Chapman, Detroit, and Henry L. Dunlap, Dearborn, Mich., assignors to Evans Products Company, Plymouth, Mich., a corporation of Delaware Application April 8, 1955, Serial No. 500,074

9 Claims. (Cl. 105—368)

This invention relates broadly to new and useful improvements in carriers for automotive vehicles and more particularly to a novel mounting for relieving the tie-downs which connect the vehicles to the carrier of shock loads to which they otherwise are subjected in use and which frequently are sufficiently severe to break or otherwise damage the tie-downs or their adjuncts.

Although not necessarily limited thereto, the shock-absorbing mounting of this invention is primarily adapted and pre-eminently suited for use in automotive carriers of the type shown in a copending application of Raymond O. Sturdy, Winston T. Rigney and James A. Lowing, Serial No. 490,054, filed in the Patent Office on February 23, 1955, and a copending application of George M. Schueder, Raymond O. Sturdy, Frank J. Acton and Frank A. Glomb, Serial No. 624,528, filed in the Patent Office on November 27, 1956. These applications are concerned primarily with the transportation of automotive vehicles by rail, and they disclose specially constructed double-deck railway cars, each capable of transporting a relatively large number of automobiles. A novel ramp arrangement incorporated in the car permits the vehicles to be moved readily between the upper and lower decks, and the arrangement is such that the ramp structures support certain of the vehicles during transportation thereof. The other vehicles not supported by the ramp structures rest either upon a flat deck surface or on supporting rails provided for the purpose.

Regardless of the nature of the supporting structure, however, it is essential in every instance to fasten the vehicles securely to the carrier. This is accomplished by tie-downs of one kind or another, but we prefer to use tie-downs of the type shown in a copending application of Harvey W. Chapman and Henry Lee Dunlap, Serial No. 490,051 which was filed in the Patent Office on February 23, 1955. These tie-downs have a number of special advantages over conventional tie-downs, particularly when used on a railway carrier of the type here under consideration. The tie-downs fasten the vehicles securely to the carrier and prevent them from being damaged by sudden application of shock loads or during transportation thereof by back-and-forth motion or by bouncing of the vehicles. It is essential, particularly in the case of a railroad car form of carrier, to provide some means for relieving the tie-downs of shock loads. These loads may occur under a variety of conditions but they are particularly severe when the carrier car is being coupled to another car or when another car is being coupled to the carrier car or to a train of which the carrier car is a part. Shock loads imposed on the tie-downs under these conditions often are sufficient to break or damage the tie-downs or their connections. The instant invention provides a shock-absorber mounting that can be incorporated either in the ramp construction or in the floor construction of the car, but it is primarily adapted and pre-eminently suited for use in the floor of the car. When so incorporated the mounting functions efficiently to relieve the tie-downs of damaging shock. Also, the mounting serves the very important purpose of preventing damage to the automobile to which it is attached. It is the practice to make automobile frames of increasingly thin metal, and the tie-downs are conventionally attached either through holes provided in the frames or to fastening loops attached to the frame. In either event, it is important that the vehicles be fastened during transportation in such a way that the frames are not torn or distorted. As suggested, in the transportation of automobiles by rail and using conventional rigid tie-down devices, the vehicle frames frequently are subjected to shock loads of sufficient magnitude to damage them. It is the function of the instant mounting to attach the vehicle with its relatively light frame construction to the railway car in such a way and by such means that the frames cannot be damaged by ordinary operation and handling of the carrier car.

In the drawings forming a part of this specification and wherein like numerals are employed to designate like parts throughout the same:

Fig. 1 is a side elevational view showing schematically one form of tie-down supporting rail embodying the invention, the rail being shown above the floor of the flatcar to facilitate illustration;

Fig. 2 is a schematic view similar to Fig. 1 but showing a modified mounting for the tie-down supporting rail, the rails being shown above the floor of the flatcar to facilitate illustration;

Fig. 3 is a fragmentary, transverse, sectional view showing a construction embodying the invention in which the structure to which the shock absorbers are attached is shock mounted;

Fig. 4 is a fragmentary, longitudinal, sectional view taken on the line 4—4 of Fig. 3;

Fig. 5 is a fragmentary view similar to Fig. 3 but showing a modified shock-absorber mounting; and Fig. 6 is an enlarged elevational view of the left end of the flatcar of Fig. 1, partially broken away, illustrating the tie-down supporting rails of the invention in greater detail than the schematic showing of Fig. 1.

According to the present invention, the tie-down devices are carried by resiliently mounted supporting rails and are fastened to the vehicles by rigid, unyielding connections. The tie-down supporting rails extend longitudinally of the car and preferably laterally of the vehicle wheels. They may be at the inner sides or the outer sides of the wheels, but space requirements in the case of a conventional railway flatcar usually dictates that the rails be disposed at the inner sides of the wheels. When this is the case, a pair of rails usually are provided, one at each side of the vehicle, so that each side of each car is anchored and so that the tie-down devices are more readily accessible from the side of the car. The tie-down supporting rails may be continuous for the full length of the car, as shown in Fig. 1, or they may comprise relatively short sections disposed at the ends and between the vehicles as shown in Fig. 2.

In this connection it will be observed that Fig. 1 shows a railway car 10 having the usual wheel trucks 12 and 14. Vehicles 16, 18, and 20 are mounted in longitudinally spaced relation on the flat deck or floor 22 of the car 10, and tie-down rails 24 extend substantially the full length of the car alongside the vehicles. Only one rail 24 is shown in the drawing but it will be understood that a separate rail is provided at each side of the car, the two rails being identically mounted and similarly disposed with respect to the car 10 and the vehicles 16, 18, and 20. More specifically, the rails 24 are supported at spaced intervals along the length thereof by resilient mountings 26 such as hereinafter described, and each vehicle 16, 18, and 20 is fastened to the supporting rails by tie-down devices 28. Any type of known resilient mounting 26 suitable for the purpose of this invention can be used, but mountings in the form of solid rubber blocks are preferred. Also, it is contemplated that various forms of tie-down devices 28 be used, but the form of the invention shown in the copending application Serial No. 490,051 which was filed in the Patent Office on February 23, 1955, is preferred. Usually, two tie-down devices 28 are provided at opposite sides and adjacent the front of the vehicle, and two additional tie-down devices are provided at opposite sides and adjacent the rear of the vehicle. Thus, in a typical arrangement, there are four tie-down devices attached to each of the vehicles 16, 18, and 20, and any tendency for the vehicles to roll or move on the car 10 is transferred through the tie-down devices 28 and resisted by the collective action of the mountings 26.

Fig. 2 shows automotive vehicles 16, 18, and 20 mounted on a railway car 10 as in the form of the invention shown in Fig. 1; however, in this case each tie-down supporting rail is divided into relatively short sections 30, 32, 34, and 36 which are disposed at the ends of and between the vehicles 16, 18, and 20. As previously described, identical rail sections are provided at each side of the vehicles 16, 18, and 20, and each section is attached to the car 10 by resilient mountings 26, as shown in the drawing. The vehicles 16, 18, and 20 are attached to the rail sections 30, 32, 34, and 36 by tie-down devices 28 as in the first form of the invention. In this case the tie-down devices 28 and the resiliently mounted supporting rail sections 30, 32, 34, and 36 yieldably resist relative movement between the vehicles 16, 18, and 20 and the car 10, but the resilient mountings 26 of all the rail sections are not available to resist movement of each car. This may create some difficulty in practice, particularly if the vehicles 16, 18, and 20 vary to any substantial degree in size and weight or if the car 10 is not fully loaded. However, the arrangement is superior to conventional means for fastening the vehicles to a railway car and except for the particular conditions specified above, the resiliently mounted rail sections 30, 32, 34, and 36 effectively prevent the application of excessive shock loads to the tie-down devices 28 and their connections by ordinary use or movement of the car 10 in the same manner as in the first form of the invention.

The mounting arrangement shown in Fig. 2, while superior to conventional tie-down arrangements, is subject to the disadvantage that same relative movement is permitted between the points where the tie-down devices are attached at opposite ends of each vehicle. This in turn permits some longitudinal movement of the vehicle relative to the car, and under severe shock loads this movement may be sufficient to cause the vehicle to rebound with sufficient force to snap a tie-down connection. In any event the rebound subjects the tie-downs and the frames of the vehicles to excessive strain. This contingency is eliminated entirely by the construction shown in Fig. 1 where the tie-down connections 28 are all fastened to a single rail. In this latter construction any tendency for any vehicles 16, 18, and 20 to lunge or move longitudinally on the car 10 is distributed among all of the shock mountings which support the tie-down rails, and since the points at which the tie-down connections fasten at opposite ends of the car are maintained in fixed spaced relation under the conditions of use, rebound snap of the tie-down connections is substantially eliminated. On the other hand, the tie-down arrangement shown in Fig. 2 is superior when the car 10 is not fully loaded. If all three vehicles 16, 18, and 20 are on the car as shown in Fig. 1, a predetermined desired shock-absorbing action is obtained. However, if only one or two cars are shipped, the shock-absorbing action is modified due to the fact that much less total weight is sustained by the shock mountings. Manifestly, the shock-absorbing action varies with the total size and weight of the vehicle or vehicles connected thereto. The shock-mounting arrangement shown in Fig. 2, on the other hand, functions essentially uniformly regardless of the number of vehicles on the car 10.

As most clearly illustrated in Figs. 3 and 6, the floor of the vehicle is designated by the numeral 38 and the floor is provided with a longitudinal slot 40 which accommodates tie-down devices 42 by means of which a vehicle supported on the floor 38 is secured to the car. The tie-down devices 42 here shown are the devices covered by the copending application Serial No. 490,051.

As suggested, two slots 40 are provided, one at each side of the car. The slots 40 are under the vehicles inwardly of the wheels 43 so as to position the tie-down devices 42 properly for attachment to the chassis connections 45 of the vehicles and to make the tie-down devices conveniently accessible from the side of the car. Several important advantages are accomplished by depressing the tie-down devices 42 and their supporting structures in the floor or deck of the car. By lowering the tie-down devices below the deck surface, it is possible to increase the angle between the tie-down chain connections 47 and the vehicle frame to which it is attached. In other words, with the tie-down devices depressed below the floor surface the tie-down connections incline angularly upwardly at a steeper angle than otherwise would be the case, and this in turn exerts a greater downward pull on the vehicle. The vehicles are pulled downwardly more solidly against the deck of the car and, as a result, part of the shock transferred to the vehicles through the tie-downs is taken up by the inherent resiliency or springiness of the automobile tires and frame. The problem presented is a very real one in view of the low-slung construction of present-day automobiles. If the shock mountings are at floor level, the angle between the tie-down connections and the vehicle is relatively flat, and the flat angle connection transmits shock loads in an undesirable manner more or less directly to the vehicle frame. Also, the flat angular relation between the tie-downs and the vehicle frames does not exert a sufficient downward pull on the vehicles and the latter can bounce or move vertically an excessive amount and often a sufficient distance to damage the vehicle bodies. When the tie-down devices are mounted below the floor surface of the car they can be covered over when not in use to provide a continuous, flat floor surface. Suitable plates (not shown) can be provided for covering the slots 40 and if desired these plates can be hinged to the floor 38 at one side of the slots. When the tie-downs are in use the covers are folded back onto the deck surface, and when the tie-downs are not in use the covers are swung on their pivot connections to cover the slots 40. In this manner it is possible to adapt the car either for carrying automotive vehicles or for other freightloads.

Both of the slots 40 and the mountings for the tie-down devices 42 are identical so that a detailed description of one will suffice. In the particular construction here shown by way of illustration, longitudinal floor stringers 44 and 46 are provided under the floor 38 at opposite sides of the slot 40, and longitudinal angles 48 and 50 at the inner sides of the stringers are attached thereto by welding or the like. One flange of the angle members 48 and 50 extends horizontally inwardly from the floor stringers 44 and 46 and conventional sandwich-type shock absorbers 52 and 54 are provided at spaced intervals along the length of the angle members. This type shock absorber comprises a rubber block 51 between and vulcanized or otherwise bonded to metal plates 53 and 55. As shown in the drawings, the shock absorbers 52 and 54 are suspended from the horizontal flanges of the angles 48 and 50 and the upper plates 53 of the shock absorbers are bolted or otherwise fastened securely thereto.

Disposed between the angles 48 and 50 is an essentially free-floating supporting structure for the tie-down devices 42. This structure is here shown in the form of a pair of laterally spaced, parallel, longitudinally extending rails 56 and 58 here shown in the form of angle irons. The flanges 60 and 62 of the rails 56 and 58 are disposed horizontally, as shown in Fig. 3, and the horizontal flanges extend inwardly from vertically disposed, downwardly extending flanges 64 and 66. The rails 56 and 58 may extend the full length of the floor 38 as shown in Fig. 1 or they may comprise a plurality of sections as shown in Fig. 2. In either event, however, the horizontal flanges 60 and 62 are spaced apart to define a longitudinally extending space 68 therebetween in which the tie-down devices 42 travel. As described in the copending application Serial No. 490,051, the tie-down devices 42 are adjustable along the rails 56 and 58, and holes 70 and 72 are provided in the horizontal flanges at spaced intervals therealong for receiving a latch bar 74 on the tie-down whereby to hold the latter in a selected, adjusted position. The rails 56 and 58 are connected at spaced points along the length thereof by transverse plates 76 bolted thereto and the spacing of the plates is coincident to the spacing of the shock absorbers 52 and 54. As shown in the drawing, the plates 76 project laterally beyond the rails 56 and 58, and the projecting portions thereof engage and are fastened to the bottom plates 55 of the shock absorbers 52 and 54. Thus, the rails 56 and 58 and the tie-down devices 42 carried thereby are attached to the main frame of the car solely through the shock absorbers 52 and 54, and shock loads applied to the car are transmitted to the tie-down connections solely through the shock absorbers. In practice, the shock absorbers 52 and 54 greatly reduce the effect of the shock loads on the tie-down connections and effectively prevent breakage or damage to the connections.

In connection with the foregoing it should perhaps be pointed out that the severity of the shock is a function of the force of the shock and the time involved in its application. Loads applied quickly to the car 10 have a shock effect of high magnitude. In practice, shock loads are encountered under a variety of circumstances such as when the cars are humped, when the train is started quickly so as to suddenly remove slack from the couplings, and almost invariably when one car is coupled to another. The above operations produce primarily vertical and fore and aft shock but substantial side-to-side shocks also occur if coupling takes place on a curved track section or as a result of sidesway occurring when the car travels over succeeding reversed curves. Experience has demonstrated that the rubber mountings 54 are particularly efficacious to absorb energy from shock loads in all directions regardless of their cause. When the tie-down connections are sufficiently steep, they place the rubber mountings 51 under a combination of shear and compression so as to leave the rubber mountings in a condition to effectively absorb shock energy. The rubber mountings are never in tension under these conditions. As a consequence, the shock load is never permitted to reach the peak value which it otherwise would achieve, and the rubber mountings are used to maximum advantage.

In an installation of this type it is necessary to provide means for preventing overstressing of the shock absorbers 52 and 54 by excessive movement of the tie-down supporting rails 56 and 58, and in the particular form of the invention here shown by way of illustration this means comprises a stationary plate 78 extending transversely of the car and riveted or otherwise connected to a transverse car frame member 80. The plate 78 fits into recesses 82 in the rails 56 and 58 and in each instance the length dimension of the recess 82 is greater than the width dimension of the plate 78. Thus, the rails 56 and 58 are free to move longitudinally of the car within limits defined by the recesses 82. The amount of movement permitted in any particular instance, of course, varies with the particular form of shock absorber employed and the purpose served by the mounting as a whole. The important thing, however, is to prevent overstressing of the shock absorbers, and it will be readily apparent that this can be done by properly regulating the length of the recesses 82. Also, it will be readily apparent that very little shock or impact usually occurs when the limiting stops come into operation due to the fact that most of the shock has already been absorbed by the shock mountings.

If the rails 56 and 58 extend the full length of the car, as shown diagrammatically in Fig. 1, one plate 78 may be sufficient; however, it will be readily appreciated in this connection that any desired number of plates can be used and the number may vary depending upon the exigencies of the particular situation. On the other hand, if the rails 56 and 58 comprise a plurality of individual sections as shown in Fig. 2, a separate plate 78 must be provided for each of the rail sections.

Under certain conditions, the effectiveness of the shock absorbers 52 and 54 can be enhanced by inserting friction plates 84 between the angles 48 and 50 and the adjacent rails 56 and 58. Such a plate is shown in Fig. 5 between the angles 48 and 56. The friction plates 84 preferably are made of brake-band material, but if desired they may be made of metal or the like. In any event, however, they are fastened to one or the other of the angles 48, 50, or 56, 58. In Fig. 5 the friction plate 84 is a metal plate welded to the angle 48 and it bears against the angle rail 56 so as to have a braking effect on movement of the latter to slow down rebound and to limit oscillation of the rail in use. The friction plates 84 preferably are sufficiently thick to force the rails 56 and 58 inwardly so as to distort the rubber elements 51 of the shock absorbers 52 and 54 (Fig. 5). Distortion of the rubber elements 51 preloads the brake-band material 84 thus increasing the friction available for dampening.

It may thus be seen that we have accomplished the objects of our invention. We have provided a novel shock mounting that is primarily adapted and preeminently suited for transportation of automotive vehicles and more particularly the transportation of automotive vehicles by rail. We have provided a novel mounting which relieves the tie-down devices conventionally used to fasten the vehicles in place during transportation of excessive and destructive stresses and strains to which they normally are subjected. The arrangement shown permits the use of conventional tie-down devices and does not require, apart from the mounting itself, the use of any unusual equipment or apparatus. Conventional railway cars can be equipped with shock mountings embodying the invention, and cars so equipped can be used in the ordinary conventional manner. In every instance the shock mountings are located so that they are conveniently accessible for operation.

Having thus described the invention, we claim:

1. In a vehicle transport carrier having a vehicle supporting deck, said deck including two parallel longitudinally extending members spaced apart to define a slot, a supporting structure for a tie-down device comprising a plurality of resilient blocks affixed to the underside of each of said members, a plurality of rail supporting members extending transversely between said members each having the ends thereof attached to the bottom of a resilient block, and a pair of longitudinally extending parallel spaced-apart rails mounted on said transverse supporting members to define a second slot within said first slot, each of said rails having an inwardly projecting lip thereon whereby a tie-down device may be slidably mounted on said rails with a portion thereof slidably retained within the slot by said inwardly projecting lips.

2. The subject matter as claimed in claim 1 including blocking means for limiting the longitudinal movement of said rails relative to said supporting surface.

3. In a carrier for automotive vehicles, a main supporting structure having a flat deck surface provided with a longitudinal trough having substantially vertical side walls, two angle-shaped members each having the vertical leg thereof affixed to one of the side walls of said trough, the horizontal legs of each member extending toward each other and defining a slot therebetween spaced beneath the top of said trough, a plurality of resilient blocks affixed to the underside of each of said horizontal legs, a plurality of rail supporting members extending transversely between said horizontal legs each having the ends thereof affixed to the underside of said resilient blocks, and a pair of longitudinally extending angle-shaped members disposed within said slot with the vertical legs thereof mounted on said transverse supporting members and the horizontal legs thereof extending toward each other and defining a second slot within said first slot whereby a tie-down device may be slidably mounted on the horizontal legs defining said second slot with a portion thereof extending through said slot and engaging the underside of said legs to prevent the removal thereof.

4. The subject matter as claimed in claim 1 including friction plates affixed to each of said members and frictionally engaging the rail adjacent thereto for retarding longitudinal movement of the rails relative to the members.

5. The subject matter as claimed in claim 2 wherein the vertical legs of each of said rails have an elongated notch in the lower edge thereof, and said blocking means comprises a blocking plate affixed to said carrier and extending transversely through said elongated notches whereby said rails rest upon said blocking plates and the relative longitudinal movement between said rails and said members is limited to the difference between the length of the elongated notches and the width of the blocking plate.

6. In a vehicle transport carrier having a vehicle supporting deck, said deck including two parallel longitudinally extending members spaced apart to define a slot, resilient means affixed to the underside of each of said members, rail supporting means extending transversely beneath said members and attached to said resilient means, and longitudinally extending rail means mounted on said rail supporting means for slidably mounting a tie-down device thereon.

7. In a vehicle transport carrier having a horizontal deck structure for supporting vehicles thereon, said deck structure including two parallel longitudinally extending members spaced apart to define a slot, resilient means affixed to the underside of each of said members, plate means extending transversely beneath said members and attached to said resilient means, and tie-down means for connecting said plate means to said vehicles supported on said deck structure whereby shocks transmitted to said vehicles during transit are absorbed by shear and compressive forces in said resilient means.

8. The subject matter as claimed in claim 9 including support means slidably supporting said plate means and for maintaining a predetermined maximum distance between the underside of said deck member and said plate means.

9. In a vehicle transport carrier having a frame, a longitudinally extending member mounted on said frame, rubber elements attached to the underside of said members, plate means attached to the underside of said rubber elements, and tie-down means connected to said plate means for tying down vehicles on the transport carrier.

References Cited in the file of this patent
UNITED STATES PATENTS

| | | |
|---|---|---|
| 1,934,841 | Copony | Nov. 14, 1933 |
| 2,020,270 | Wilson et al. | Nov. 5, 1935 |
| 2,046,391 | Latshaw | July 7, 1936 |
| 2,052,914 | Williams | Sept. 1, 1936 |
| 2,073,617 | Armington | Mar. 16, 1937 |
| 2,128,667 | Atherton | Aug. 30, 1938 |
| 2,159,479 | Goodwin et al. | May 23, 1939 |
| 2,574,410 | O'Connor | Nov. 6, 1951 |
| 2,729,173 | Couch | Jan. 3, 1956 |
| 2,779,543 | Gronlund | Jan. 29, 1957 |

FOREIGN PATENTS

| | | |
|---|---|---|
| 496,150 | Belgium | June 30, 1950 |